US012244077B2

(12) United States Patent
Lonbani et al.

(10) Patent No.: US 12,244,077 B2
(45) Date of Patent: Mar. 4, 2025

(54) WIDE-BAND ANTENNA WITH PARASITIC ELEMENT

(71) Applicant: Meta Platforms Technologies, LLC, Menlo Park, CA (US)

(72) Inventors: Navid Barani Lonbani, Bellevue, WA (US); Nil Apaydin, Kirkland, WA (US); Liang Han, Sunnyvale, CA (US); Fengyu Ge, Monroe, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 174 days.

(21) Appl. No.: 18/052,220

(22) Filed: Nov. 3, 2022

(65) Prior Publication Data

US 2024/0154306 A1 May 9, 2024

(51) Int. Cl.
*H01Q 5/378* (2015.01)

(52) U.S. Cl.
CPC .................................. *H01Q 5/378* (2015.01)

(58) Field of Classification Search
CPC .......... H01Q 5/30; H01Q 5/378; H01Q 5/392; H01Q 1/242-243
See application file for complete search history.

(56) References Cited

U.S. PATENT DOCUMENTS 10,020,579 B1 * 7/2018 Zheng .................... H01Q 1/243
11,133,573 B2 * 9/2021 Chen ........................ H01Q 1/48
2012/0256800 A1 * 10/2012 Kuonanoja ............ H01Q 5/335 343/749
2013/0307736 A1 * 11/2013 Larsen ..................... H01Q 9/16 29/601
2014/0113693 A1 * 4/2014 Wei ........................ H01Q 1/243 455/575.7
2014/0225787 A1 * 8/2014 Ramachandran ...... H01Q 13/10 343/702
2014/0327584 A1 * 11/2014 Chang .................... H01Q 5/378 343/702
2015/0109168 A1 * 4/2015 Chang .................... H01Q 5/371 343/700 MS
2015/0171508 A1 * 6/2015 Jeon ....................... H01Q 5/307 343/702
2017/0033460 A1 * 2/2017 Ayala Vazquez ...... H01Q 1/245
2017/0040668 A1 * 2/2017 Ayala Vazquez .... H01Q 13/106
2017/0201011 A1 * 7/2017 Khripkov ................. H01Q 1/42
2018/0034134 A1 * 2/2018 Dalmia .................. H01Q 1/243
2018/0323496 A1 * 11/2018 Lee ........................ H01Q 1/245
2019/0067796 A1 * 2/2019 Lu .......................... H01Q 1/243
2019/0198975 A1 * 6/2019 Chen ........................ H01Q 9/42
(Continued)

*Primary Examiner* — Jason M Crawford
(74) *Attorney, Agent, or Firm* — Greenberg Traurig, LLP

(57) ABSTRACT

The disclosed system may include a frame, a printed circuit board (PCB) mounted to the frame, and at least one antenna electrically connected to the PCB via an antenna feed. The antenna may be shorter than a maximum specified length, and the antenna may be intended to operate within a specified frequency range for which the antenna's length is insufficiently long. Still further, in this system, electrical current flowing to the antenna may be routed to at least a portion of the frame to create a parasitic arm. As such, the parasitic arm may radiate in conjunction with the antenna, providing constructive interference in the specified frequency range. Various other mobile electronic devices, apparatuses, and methods of manufacturing are also disclosed.

20 Claims, 8 Drawing Sheets

(56) References Cited

U.S. PATENT DOCUMENTS

| | | | | |
|---|---|---|---|---|
| 2019/0341675 | A1* | 11/2019 | Yamagajo | H01Q 1/48 |
| 2020/0203807 | A1* | 6/2020 | Wu | H01Q 23/00 |
| 2020/0204199 | A1* | 6/2020 | Wu | H01Q 5/364 |
| 2023/0006345 | A1* | 1/2023 | Yang | H01Q 1/44 |
| 2023/0029513 | A1* | 2/2023 | Cai | H01Q 1/243 |
| 2024/0154306 | A1* | 5/2024 | Lonbani | H01Q 9/42 |

* cited by examiner

WIDE-BAND ANTENNA WITH PARASITIC ELEMENT

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
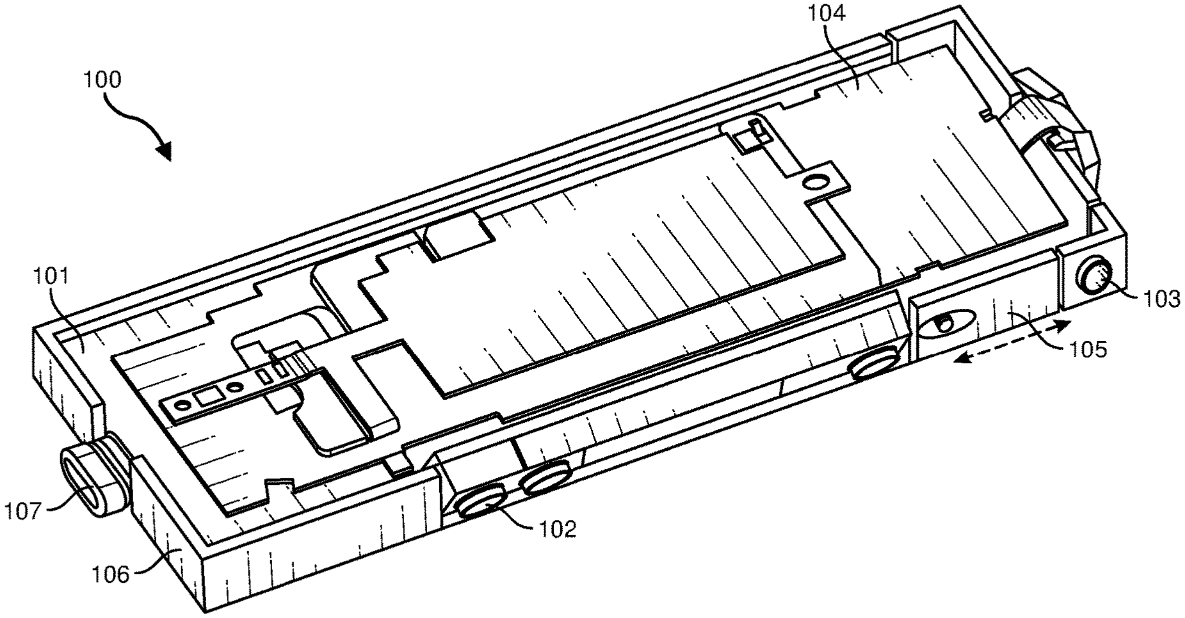
FIG. 1 illustrates a top view of a mobile electronic device that may include an antenna architecture implemented therein.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to antenna architectures that implement a parasitic element to improve antenna efficiency. In some cases, the embodiments herein may specifically improve mid-high band frequencies in the 1.5 GHz-3.25 GHz range. In some cases, these antenna architectures may be implemented to avoid the use of tuners or other elements that may complicate other systems. Indeed, some newer electronic devices are much smaller than preceding devices, and may have a larger number of electronic components. These additional components may limit the size of antennas that may be used within the device. Longer antennas are typically necessary to radiate at lower frequencies. In some cases, tuners may be used to make up for this lack of length in antennas. However, adding tuners to the antenna feed may noticeably reduce the antenna's efficiency (e.g., by 1-3 dB), and may increase the complexity of the device's underlying circuitry.

In contrast, the embodiments described herein may achieve high antenna efficiency even at lower frequencies and even when using antennas that are too short for those frequencies. The antenna architectures described herein may implement various portions of the mobile device's frame as a parasitic element. In such cases, at least some of the current flowing to the antenna may be routed to the parasitic element, which may then radiate and may constructively interfere with the antenna. This constructive interference may then boost mid-high band antenna efficiency, and may do so without introducing tuners or other additional mechanical components.

In one embodiment, an antenna architecture may be provided that may improve signals in the 1.5 GHz-3.25 GHz range. Within this frequency range, it may be ideal to have a relatively long, tunable antenna that is at least 40-50 mm in length. However, due to size constraints, the mobile devices described herein may not be able to accommodate antennas of that length. To overcome this potential impediment, the antenna architectures described herein may use the frame, chassis, and/or other conductive portions of the mobile electronic device to create a parasitic element or parasitic arm that, in effect, radiates additively in phase to the chosen antenna.

This parasitic arm may be excited to radiate over a variety of different frequencies and, as noted above, may not require any additional mechanical components. Rather, existing mechanical components in the mobile device may be leveraged to create a large parasitic arm (or multiple smaller parasitic arms) that enhance the antenna's efficiency and, at least in some particular cases, enhance the antenna's mid-high band efficiency. The location of the parasitic arms may be carefully and deliberately chosen to ensure that the radiation from the parasitic arms constructively interferes with the radiation from the (mid-high) band antenna. These embodiments will be described in greater detail below with regard to FIGS. 1-10.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 9:
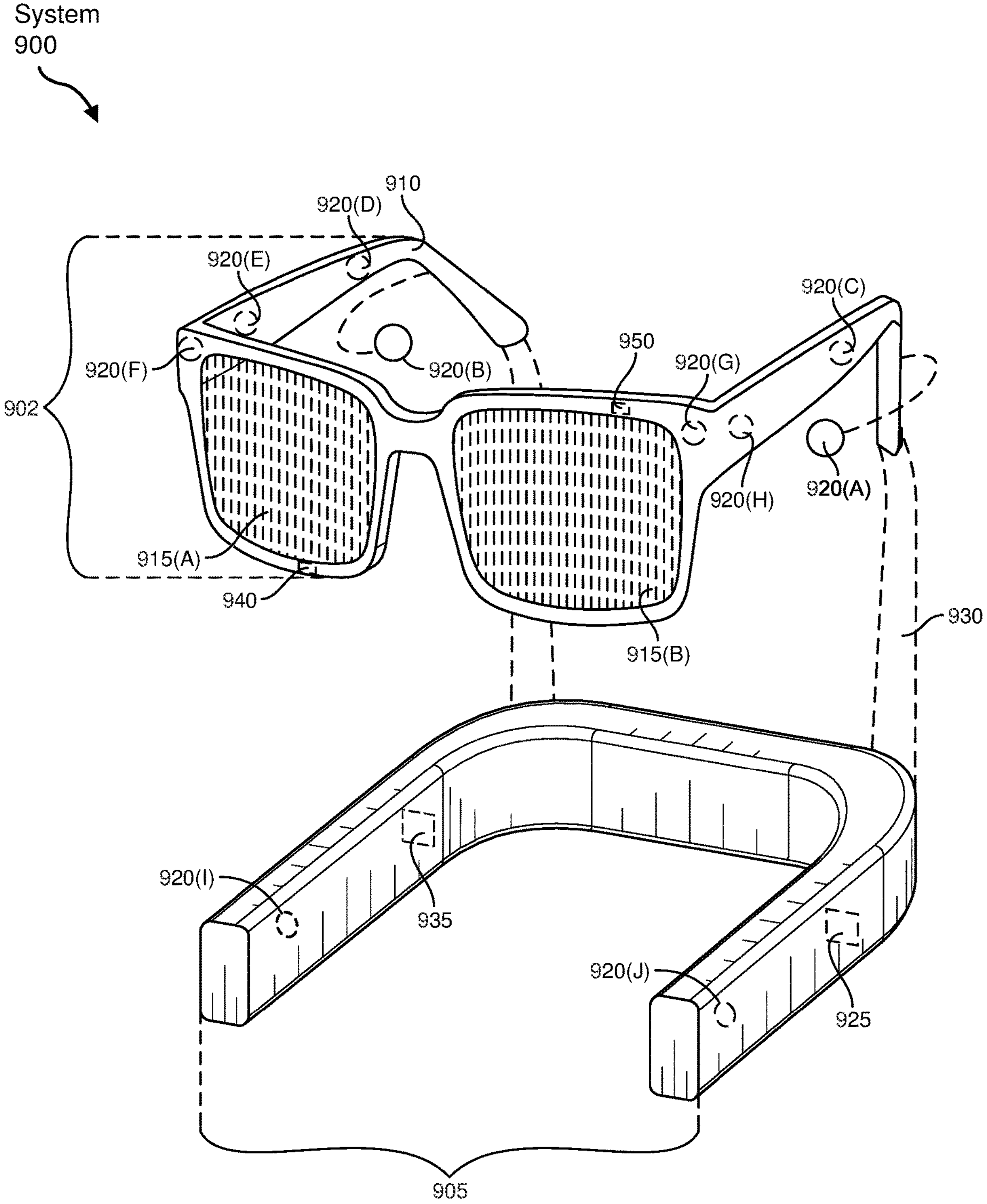
FIG. 9 is an illustration of exemplary augmented-reality glasses that may be used in connection with embodiments of this disclosure.
Figure 10:
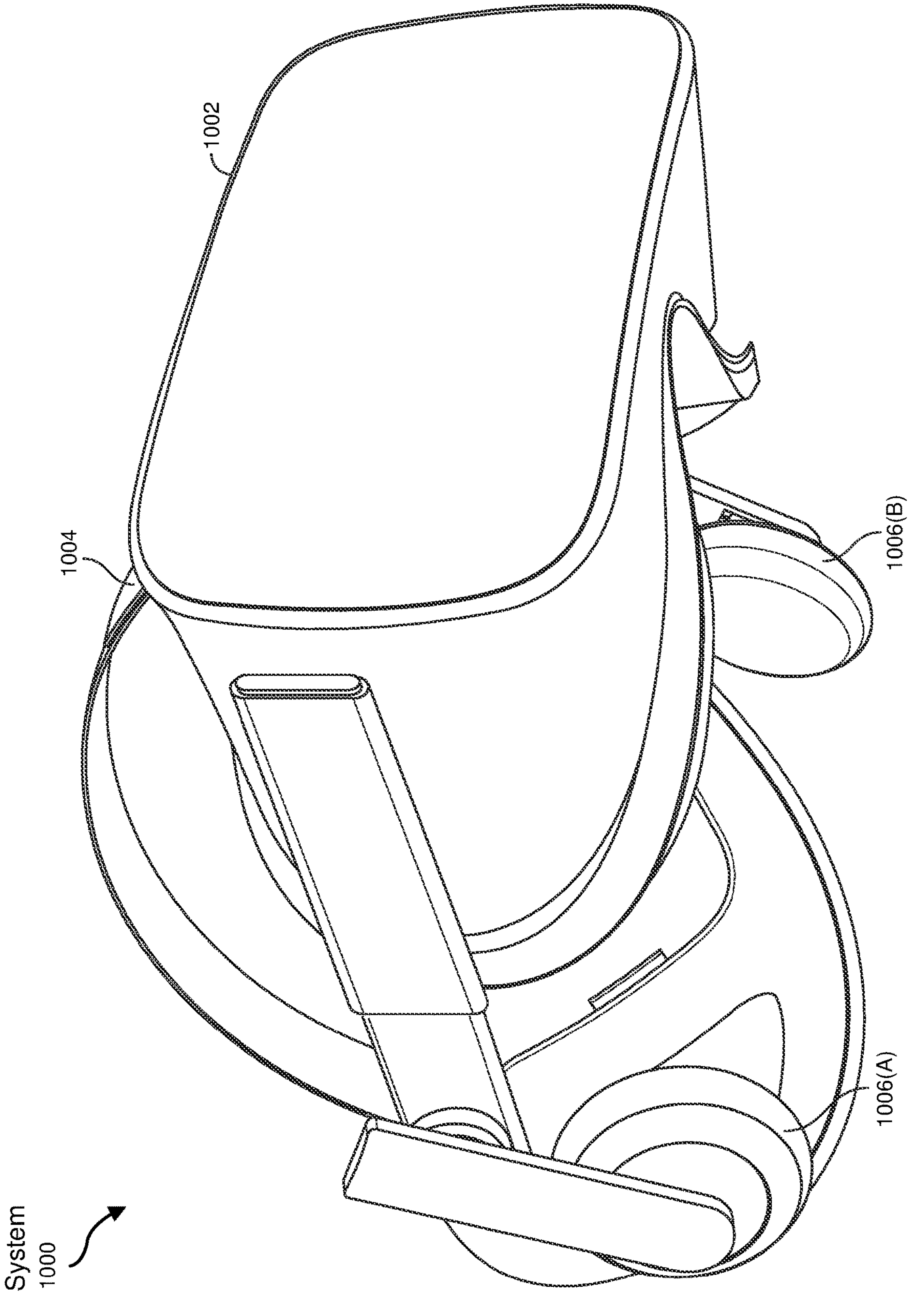
FIG. 10 is an illustration of an exemplary virtual-reality headset that may be used in connection with embodiments of this disclosure.

FIG. 1 illustrates a system 100 that may be a mobile electronic device or may be part of a mobile electronic device. For instance, the system 100 may be part of an artificial reality device (e.g., as shown in FIG. 9), part of a virtual reality device (e.g., as shown in FIG. 10), may be a computing accessory device for such devices, may be a gaming device or wearable device, or may be part of some other type of mobile electronic device. The system 100 may include a frame 101 and a printed circuit board (PCB) 104 mounted to the frame. The frame 101 may be made entirely or partially of metal or other conductive materials such as conductive polymers. The frame 101 may provide structural support for the mobile electronic device and may provide mounting space for the PCB 104 or for other PCBs or other components. In some cases, the PCB may be electrically connected (e.g., electrically grounded to) the conductive frame. The PCB 104 may house various electronic components including processors, memory, communications modules, batteries, antenna feeds (e.g., tuners, amplifiers, impedance matching circuits, signal processors, etc.), or other electronic components.

In some cases, the system 100 may include multiple different antennas. These antennas may be designed for communication within different frequency bands. The antennas may be of different types, including monopole, dipole, slot, patch, inverted F, planar inverted F, or other types of antennas. The antennas (e.g., 105) may be of different lengths. Longer antennas may be implemented for lower frequencies, and shorter antennas may be used for operating at higher frequencies. Each antenna may have a specified length, and may be designed for operation within specific wavelengths. In some cases, tuners may be used to tune a given antenna to receive and/or transmit at higher or lower frequencies. For instance, a single antenna may be implemented to operate in both mid and high band cellular frequencies. The length of the antenna 105, however, may be shorter than the antenna length typically needed for operating in such frequencies.

For instance, if a mobile device (e.g., a smartwatch) has specific dimensions, the device may specify a maximum length for a given antenna (e.g., 105). As such, the antennas in the device (e.g., 105) may be equal to or less than this maximum length (e.g., 40 mm). This relatively short antenna may be intended to operate within a frequency range for which the antenna's length is insufficiently long. Instead of adding tuners to the antenna feed electrically connecting the antenna 105 to the PCB 104, the embodiments herein may implement specifically designed parasitic arms to enhance the performance and efficiency of the antenna 105, even when operating at frequencies for which the antenna is physically too short in length.

Indeed, in the embodiments herein, electrical current that is flowing through the antenna feed of the PCB 104 to the antenna 105 may be routed to at least a portion of the frame 101. This specific portion of the frame may be chosen to create a parasitic arm that radiates in conjunction with the antenna 105. This co-radiation may provide constructive interference within the desired frequency range, and may allow the antenna to operate efficiently in a frequency range for which it may not have been designed (e.g., in a frequency range for which the antenna is physically too short). The PCB 104 may be electrically connected to multiple different components that may be connected to the frame 101 or to a chassis that is electrically connected to the frame. These components may include sensors 102 and 103, communications ports 107, antennas 106, or other components. The portion(s) of the frame and/or the chassis used as parasitic arms may be selected to radiate at specific frequencies and avoid interference with these components.

Figure 2:
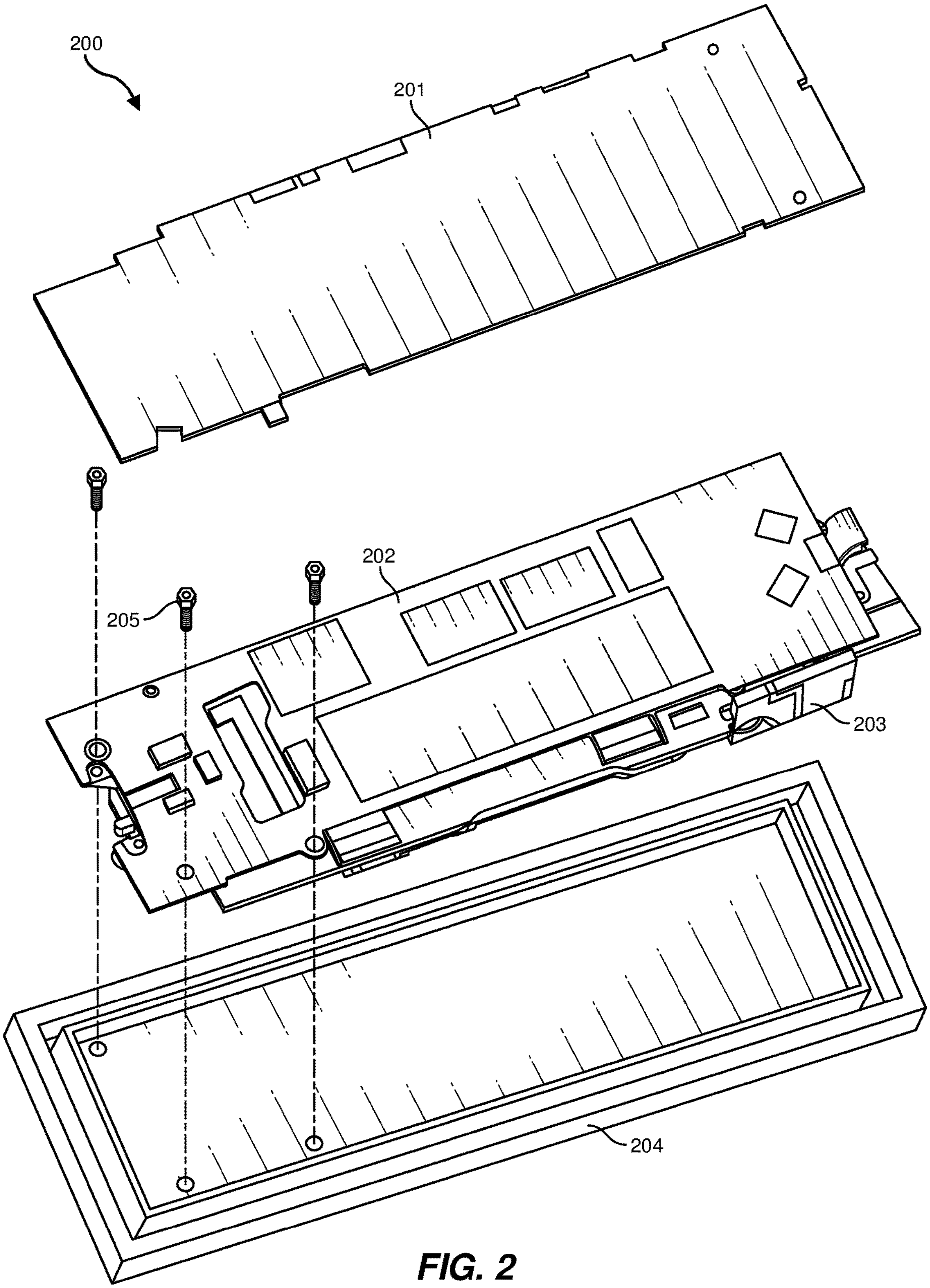
FIG. 2 illustrates an exploded view of an alternative mobile electronic device that may include an antenna architecture implemented therein.

FIG. 2 illustrates an embodiment of a mobile electronic device 200 shown in exploded view. The mobile electronic device 200 may include a PCB 201 that is mounted to a chassis 202. The backside portion of the PCB 201 is shown, with electronic components (unseen) facing downwards. The PCB 201 may be electrically connected to a chassis 202. The chassis 202 may function as a support element that houses or secures components such as sensors or antennas. The chassis 202 may be made entirely or partially of a conductive material such as metal or conductive polymer. The chassis 202 may be physically mounted to the frame 204 at one or more positions using screws 205, clips, or other fasteners, at least some of which may be conductive. In this embodiment, the antenna 203 may be physically attached to the chassis. In some cases, the antenna 203 may also be attached to or electrically connected to the frame 204. Like the chassis 202, the frame may also be made entirely or partially of conductive material. In some cases, the frame may be polished aluminum or other metal. The frame 204 may also include plastic or other potentially insulating components.

Figure 3:
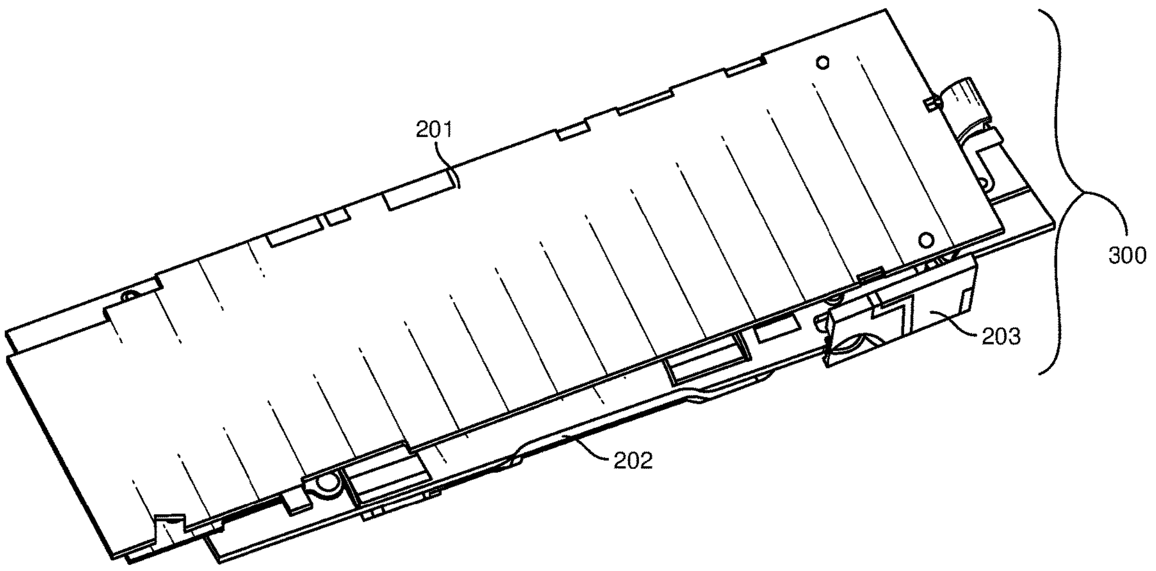
FIG. 3 illustrates front perspective view of an alternative mobile electronic device that may include an antenna architecture implemented therein.

FIG. 3 illustrates an embodiment 300 of a combined PCB 201 and chassis 202. In this embodiment, the PCB 201 may be attached to the chassis 202 at one or more different points. At least in some cases, these attachment points may be electrically conductive (e.g., screws, pins, spring clips, etc.). Accordingly, at least a portion of the electrical current flowing to the antenna 203 may be routed to the chassis 202 to create a parasitic arm. The location of the chassis to which the electrical current is routed may be specifically selected or designed to ensure that the parasitic arm created by the chassis provides constructive interference within the frequency range of the antenna 203.

Figure 4:
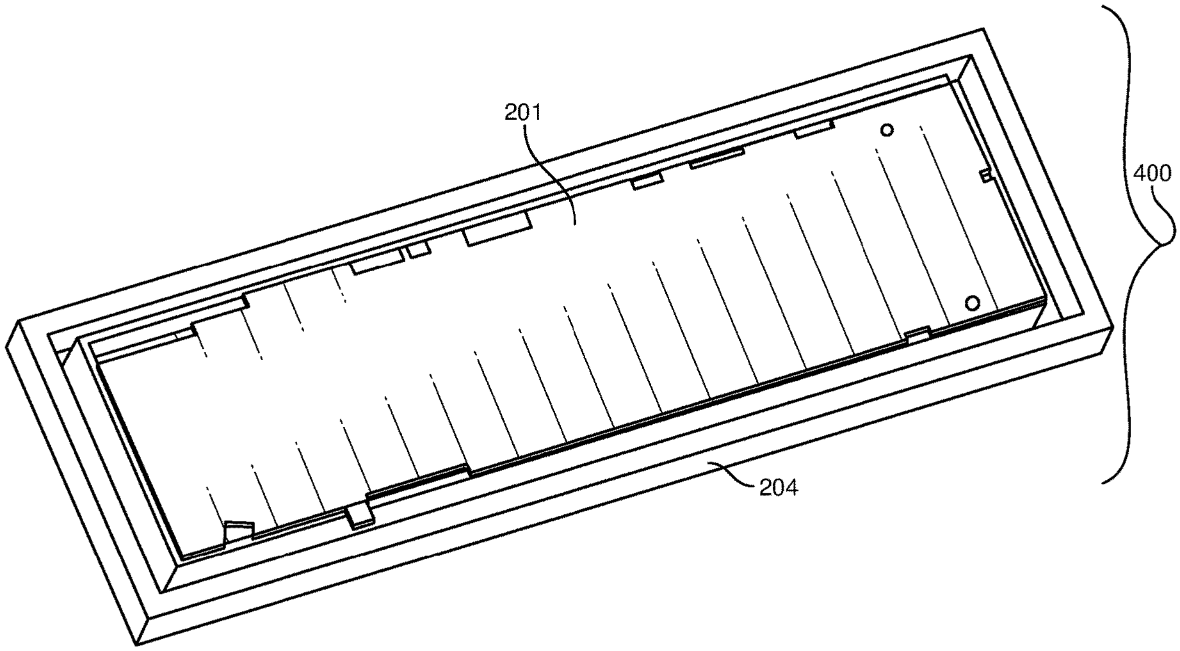
FIG. 4 illustrates a front perspective view of an alternative mobile electronic device that may include an antenna architecture implemented therein.

Similarly, in FIG. 4, an embodiment 400 is provided that may include a PCB 201 and a frame 204 (without a chassis). As above, the PCB 201 may be attached to the frame 204 at one or more different points, at least some of which may be electrically conductive. Some of the electrical current flowing to an antenna (e.g., a microstrip antenna on the PCB 201) may be routed to the frame 204. The location of the frame 204 to which the electrical current is routed may be designed or chosen to ensure that the parasitic arm created by the frame provides constructive interference within the frequency range of the antenna.

In some cases, the underlying mobile electronic device may include a PCB 201, a chassis 202, and a frame 204, along with at least one antenna 203. In such cases, the electrical current flowing to the antenna 203 may be routed to both the chassis 202 and the frame 204 to create the parasitic arm. As such, both the chassis and the frame may comprise or may themselves form the parasitic arm. The location of the frame 204 and the chassis 202 to which electrical current is routed may be selected to ensure that the parasitic arm provides constructive interference within the frequency range of the antenna 203.

Figure 5A:
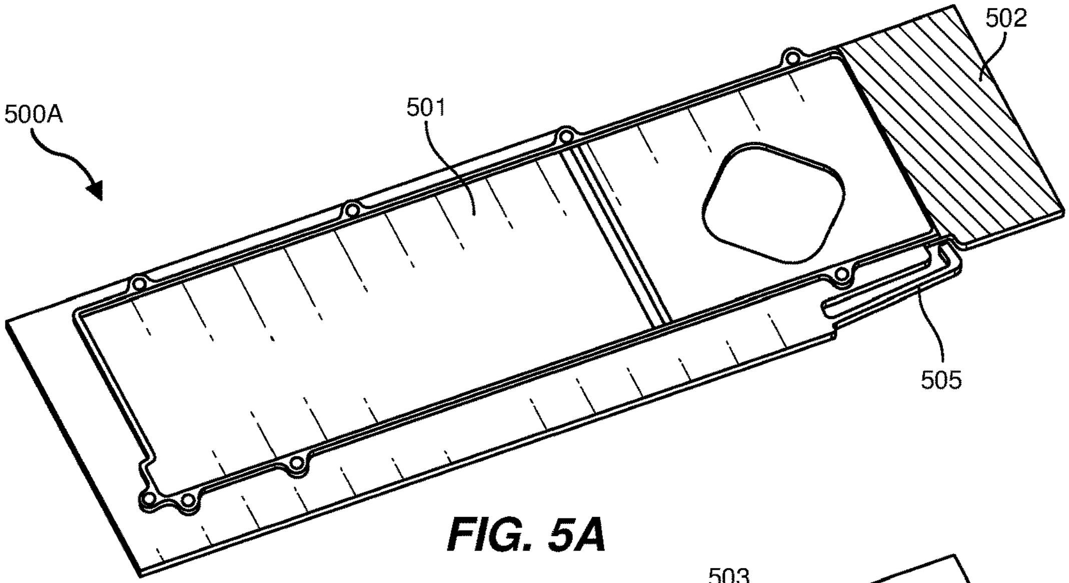
FIGS. 5A-5C illustrate embodiments in which different portions of a parasitic element are excited.
Figure 5B:
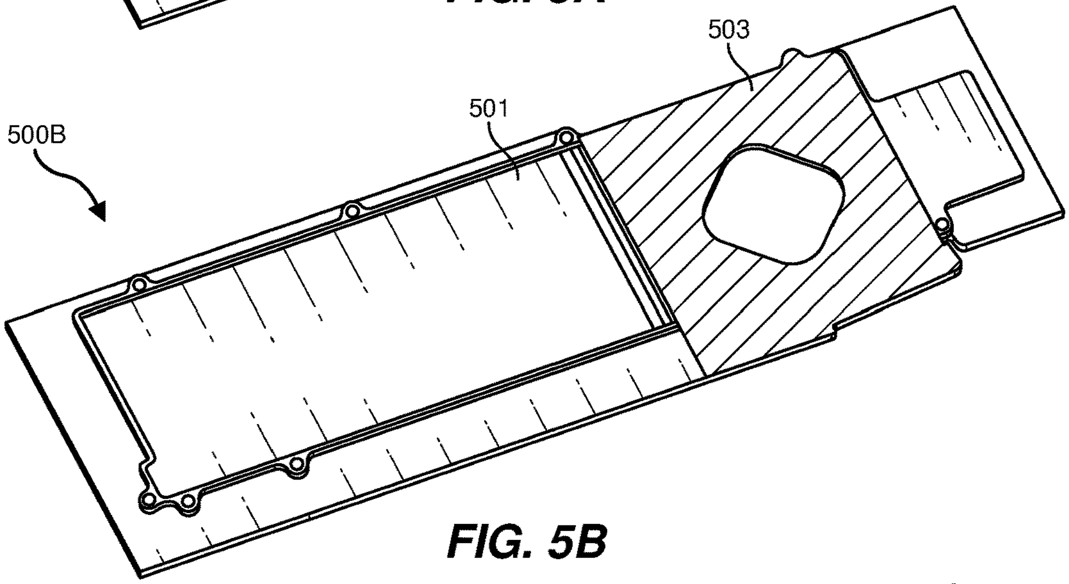
Figure 5C:
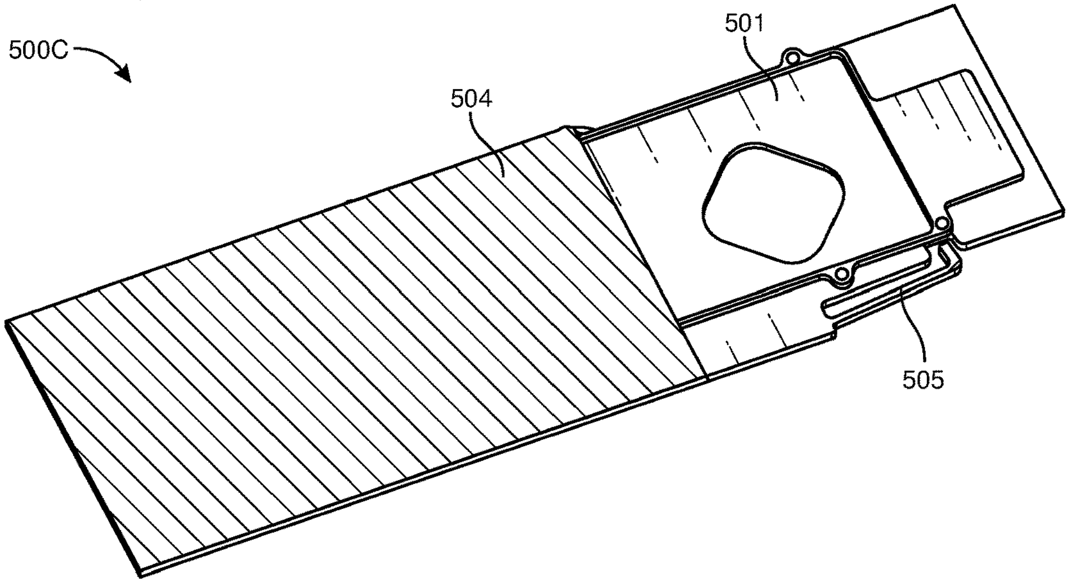
Figure 6:
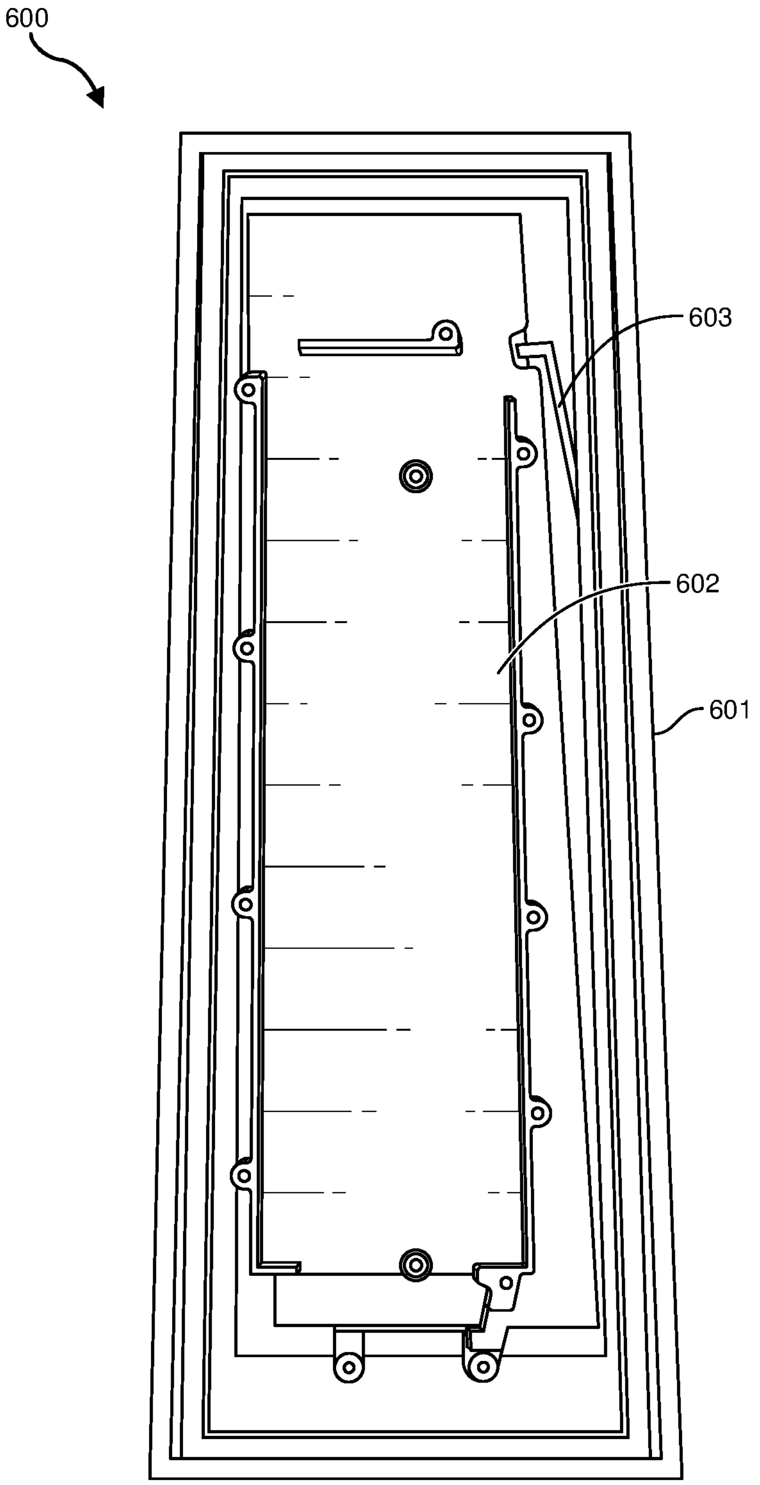
FIG. 6 illustrates an embodiment in which at least a portion of a frame is implemented as a parasitic element.

FIGS. 5A-5C illustrate embodiments in which different portions of a frame 501 may be excited as part of a parasitic arm. Here, it will be understood that a chassis may be used as a parasitic arm in addition to or as an alternative to the frame 501. In FIGS. 5A-5C, the frame may be divided into multiple different sections, each of which may be individually excited. For instance, the various sections 502, 503, and 504 may electrically separated by non-conductive portions (e.g., plastic or ceramic portions). Or, the various sections 502-504 may be electrically connected to each other via an electrical trace or other connecting element. In some cases, electrical current that flows from an antenna feed on the PCB may flow at least partly to the antenna (e.g., 203) and at least partly to the chassis or frame. The routing may occur through a screw, through a spring clip, or through some other electrical or mechanical component. As such, at least some of the electrical current form the antenna feed may be routed to a portion of the frame or chassis via a spring clip, a screw, an electrical trace, or some other element.

In embodiment 500A of FIG. 5A, the upper portion 502 of the frame 501 may be implemented as part of a parasitic arm. As such, electrical current flowing to at least one of the device's antennas may be routed to the upper portion 502 of the frame 501. In such cases, the upper portion 502 of the frame may act as a parasitic arm to an antenna of the mobile device. The parasitic arm may then radiate in conjunction with the antenna, thereby boosting the efficiency of the antenna, and allowing the antenna to operate in a frequency range for which the antenna may be insufficiently long. In some embodiments, the smaller "L-shaped" section 505 of the frame may be implemented as part of a parasitic arm. In such cases, electrical current flowing to at least one of the device's antennas may be routed to the L-shaped section 505 and, as such, the L-shaped section may act as a parasitic arm to those antennas of the mobile device.

In embodiment 500B of FIG. 5B, a middle portion 503 of the frame 501 may be implemented as part of a parasitic arm. In this case, electrical current flowing to at least one of the device's antennas may be routed to the middle portion 503 of the frame 501. As such, the middle portion 503 of the frame may act as a parasitic arm to an antenna of the underlying mobile device. That parasitic arm may then radiate in conjunction with the antenna, thereby boosting the efficiency of the antenna, and allowing the antenna to operate in a frequency range for which the antenna may be insufficiently long.

Similarly, in embodiment 500C of FIG. 5C, a lower portion 504 of the frame 501 may be implemented as part of a parasitic arm. Here, electrical current flowing to at least one of the device's antennas may be routed to the lower portion 504 of the frame 501. In such cases, the lower portion 504 of the frame may act as a parasitic arm to an antenna of the mobile device. The parasitic arm may then radiate in conjunction with the antenna, thereby boosting the efficiency of the antenna, and allowing the antenna to operate in a frequency range for which the antenna may be insufficiently long. In these cases, because electrical current is flowing to the frame and to an antenna that is connected to the device's frame (e.g., on the periphery of the device), the actual full antenna is equivalent to the antenna+the parasitic element of frame. This, at least in some cases, may raise antenna efficiency by 30-40% or more.

In one example, an antenna may be printed on a dielectric material. For instance, a microstrip antenna may be printed (e.g., using conductive ink) on a dielectric carrier or dielectric material (e.g., a metal oxide, ceramic, etc.). This material may be part of the frame of the device, and may be positioned on the periphery of the frame. In some cases, the antenna may include a slot that is configured to create a resonance within a specified frequency band (e.g., an ultra-high frequency band such as 3.3 GHz-4.2 GHz).

In some embodiments, the antenna (which includes the antenna itself and the parasitic arm) may be configured to operate in multiple different frequency bands. For instance, the antenna may be configured to operate within a lower frequency band and also within an ultrahigh frequency band (e.g., within a lower frequency range of 1.7-2.7 GHz and within an ultrahigh band 2.7 GHz-4.2 GHz). Thus, at least in some cases, a combined antenna+chassis parasitic arm or a combined antenna+frame parasitic arm, or a combined antenna+chassis parasitic arm+frame parasitic arm may be used to operate in a wide range of frequencies. In this sense, the combined or full antenna may essentially (and functionally) be two antennas operating together.

However, in the embodiments herein, the parasitic arm may be part of the existing mechanical components of the mobile device. As such, the enhanced efficiency may be added without incorporating additional components such as tuners that can reduce antenna efficiency. Moreover, the enhanced efficiency may allow an antenna that would otherwise be too short operate in a specific frequency range. Indeed, in one specific embodiment, an antenna of only 22 mm may operate in the 1.7 GHz-2.7 GHz range, when an antenna length of at least 40 mm would normally be required to operate in this frequency range.

In one embodiment, a mobile electronic device may be provided. The mobile electronic device may include a frame (e.g., 204 of FIG. 2), a printed circuit board 201 mounted to the frame, and at least one antenna 203 electrically connected to the PCB via an antenna feed. At least in some cases, the antenna 203 may be shorter than a maximum specified length (e.g., 30 mm, 40 mm, or some other specified length). Within the mobile electronic device, the antenna may be intended to operate within a frequency range for which the antenna's length is insufficiently long. Accordingly, the mobile electronic device may be designed such that electrical current flowing to the antenna 203 may be routed to at least a portion of the frame 204 (and/or to the chassis 202) to create a parasitic arm. The parasitic arm (e.g., portions 502, 503, 504, etc.) may radiate in conjunction with the antenna 203, providing constructive interference within the specified frequency range and allowing the antenna to efficiently operate within a frequency range for which it may not have been designed.

In some cases, electrical current may be routed to the frame and/or chassis via mechanical connections such as clips, screws, or other fasteners used to secure the PCB to the chassis and/or frame. In some embodiments, the electrical current flowing to the antenna may be routed to at least two different portions of the frame (e.g., 502 and 503) to create a dual parasitic arm having multiple resonances at the same or different frequencies. In other embodiments, the electrical current flowing to the antenna may be routed to at least three different portions of the frame (e.g., 502, 502, and 504) to create a triple parasitic arm having a plurality of resonances at the same or different frequencies. The location of the frame and/or chassis to which electrical current is routed may be specifically chosen to ensure that the parasitic arms provide constructive interference within the specified frequency range.

As noted above, the chassis may be electrically connected to the frame and/or electrically connected to the PCB. In embodiments where a chassis is implemented, such as in embodiment 600 of FIG. 6, electrical current flowing to the antenna may be routed to both the chassis 602 and the frame 601 to create a parasitic arm. In such cases, the chassis and the frame may be or may function as the parasitic arm. In some cases, the parasitic arm may be in different shapes. For instance, the parasitic arm in the frame or chassis may be L-shaped (e.g., element 603 of FIG. 6). Or, in other cases, the parasitic arm in the frame may be S-shaped, or may have a specially designed shape to ensure that the parasitic arm provides constructive interference to the antenna.

In some cases, different portions of the frame and/or chassis of the mobile electronic device may be implemented as parasitic arms for different antennas. Thus, if the mobile electronic device has multiple antennas, different portions of the frame or chassis (e.g., 502, 503, 504, etc.) may be used with each of the different antennas. In this manner, multiple antennas within the mobile electronic device may each have their own parasitic arm. This may allow each of these antennas to operate within a frequency range for which the respective antennas' length may be insufficiently long without implementing frequency tuners or other components that may reduce antenna efficiency.

Figure 7:
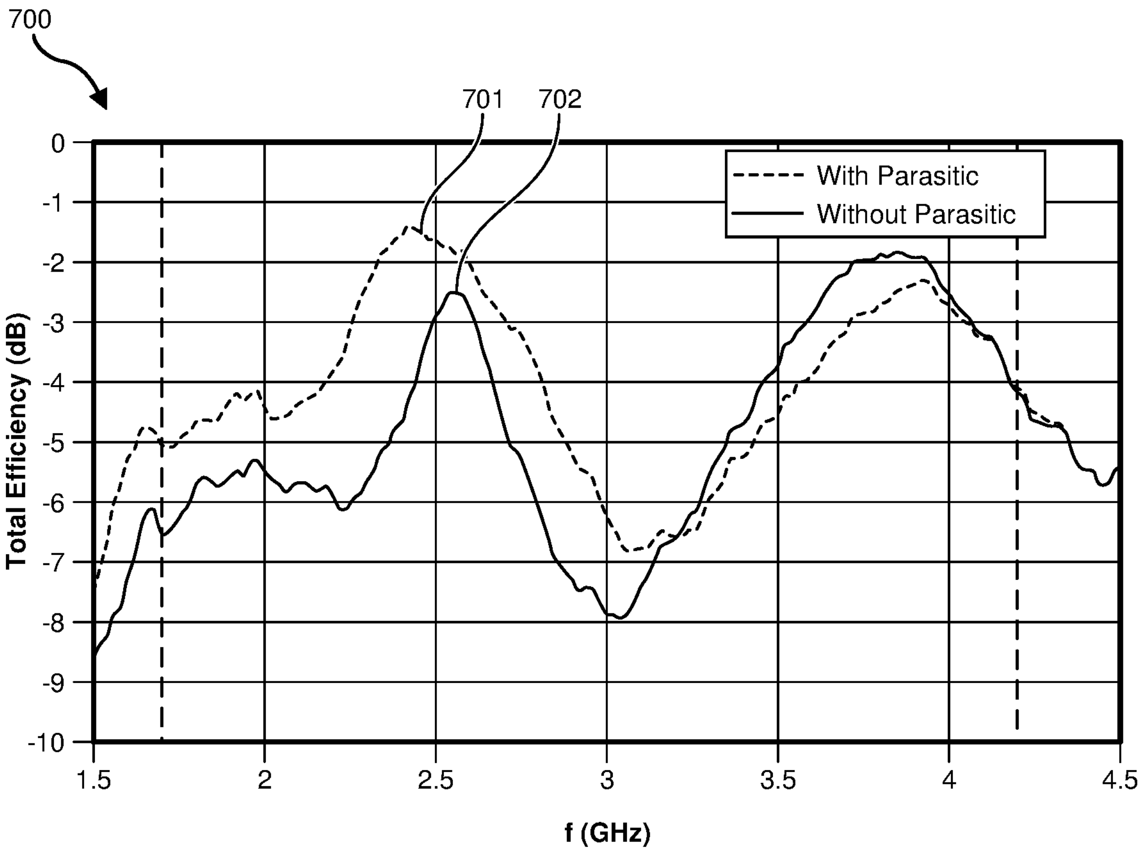
FIG. 7 illustrates a chart of antenna efficiency for embodiments that implement a parasitic element and embodiments that do not implement a parasitic element.

Such improvements in system efficiency are demonstrated in chart 700 of FIG. 7. On the y-axis, chart 700 shows the total amount of antenna efficiency in decibels (dB). On the x-axis, chart 700 shows different operating frequencies from 1.5 GHz to 4.5 GHz (although the embodiments herein may be implemented with other frequencies outside of this range). Line 702 illustrates a baseline measurement over the various frequencies, showing highest efficiencies at around 2.5 GHz and 3.75 GHz. The measurements of line 702 are measurements taken on a mobile electronic device that is not implementing a parasitic arm. In contrast, line 701 illustrates antenna efficiencies of a mobile device that is implementing a parasitic arm as described herein. For this line 701, peak efficiencies occur around 2.4 GHz and 3.75 GHz. Especially in the lower frequency range (e.g., 1.5 GHz to 3.25 GHz), the mobile electronic device with the parasitic arm outperforms the device without the parasitic arm by 1-3 dB, indicating a substantial increase in antenna performance in these lower frequencies.

Figure 8:
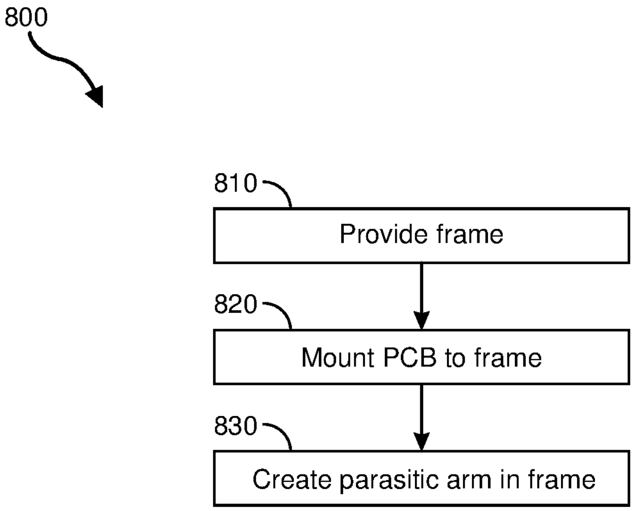
FIG. 8 is a flow diagram of an exemplary method for manufacturing a mobile electronic device that includes one or more of the antenna architectures described herein.

FIG. 8 is a flow diagram of a method of manufacturing 800 for providing, forming, creating, or otherwise generating a mobile device that includes one or more of the antenna architectures described herein. The steps shown in FIG. 8 may be performed by any suitable manufacturing equipment, including 3D printers, and may be controlled via computer-executable code and/or networked computing systems. In one example, each of the steps shown in FIG. 8 may represent an algorithm whose structure includes and/or is represented by multiple sub-steps, examples of which will be provided in greater detail below.

Method of manufacturing 800 may include, at step 810, providing a frame that is at least partially conductive. At step 820, the method 800 may include mounting a printed circuit board to the frame and, at step 830, electrically connecting at least one antenna to the PCB via an antenna feed. In this embodiment, the antenna may be shorter than a maximum specified length, and may be configured to operate within a specified frequency range for which the antenna's length is too short. In such cases, electrical current flowing to the antenna may be routed to at least a portion of the frame (and/or to a chassis) to create a parasitic arm. This parasitic arm may then radiate in conjunction with the antenna, providing constructive interference in the specified frequency range. This constructive interference may allow the short antenna to operate efficiently in a frequency range for which it was not designed. And, instead of using tuners or other lossy devices to reach different frequency ranges, the parasitic arm embodiments described herein may provide such antenna efficiencies using existing portions of the frame or chassis of the underlying mobile electronic device.

Example Embodiments

Example 1: A system may include a frame, a printed circuit board (PCB) mounted to the frame, and at least one antenna electrically connected to the PCB via an antenna feed. The antenna may be shorter than a maximum specified length, and the antenna may be intended to operate within a specified frequency range for which the antenna's length is insufficiently long. The electrical current flowing to the antenna may be routed to at least a portion of the frame to create a parasitic arm, such that the parasitic arm radiates in conjunction with the antenna, providing constructive interference in the specified frequency range.

Example 2: The system of Example 1, further comprising a chassis that is electrically connected to the frame.

Example 3: The system of Example 1 or Example 2, wherein electrical current flowing to the antenna is routed to both the chassis and the frame to create the parasitic arm, such that the chassis and the frame comprise the parasitic arm.

Example 4: The system of any of Examples 1-3, wherein the location of the frame to which electrical current is routed is selected to ensure that the parasitic arm provides constructive interference within the specified frequency range.

Example 5: The system of any of Examples 1-4, wherein the electrical current flowing to the antenna is routed to the portion of the frame via a spring clip.

Example 6: The system of any of Examples 1-5, wherein the electrical current flowing to the antenna is routed to the portion of the frame via a screw.

Example 7: The system of any of Examples 1-6, wherein the antenna is printed on a dielectric material and is positioned on a periphery portion of the frame.

Example 8: The system of any of Examples 1-7, wherein the antenna includes a slot that is configured to create a resonance within an ultrahigh frequency band.

Example 9: The system of any of Examples 1-8, wherein the antenna is configured to operate in a plurality of frequency bands.

Example 10: The system of any of Examples 1-9, wherein the antenna is configured to operate within the specified frequency band and within an ultrahigh frequency band.

Example 11: The system of any of Examples 1-10, wherein the electrical current flowing to the antenna is routed to at least two different portions of the frame to create a dual parasitic arm having multiple resonances.

Example 12: The system of any of Examples 1-11, wherein the electrical current flowing to the antenna is routed to at least three different portions of the frame to create a triple parasitic arm having a plurality of resonances.

Example 13: A mobile electronic device may include a frame, a printed circuit board (PCB) mounted to the frame, and at least one antenna electrically connected to the PCB via an antenna feed, wherein the antenna is shorter than a maximum specified length, wherein the antenna is to operate within a specified frequency range for which the antenna's length is insufficiently long, and wherein electrical current flowing to the antenna is routed to at least a portion of the frame to create a parasitic arm, such that the parasitic arm radiates in conjunction with the antenna, providing constructive interference in the specified frequency range.

Example 14: The mobile electronic device of Example 13, wherein the location of the frame to which electrical current is routed is selected to ensure that the parasitic arm provides constructive interference within the specified frequency range.

Example 15: The mobile electronic device of Example 13 or Example 14, further comprising a chassis that is electrically connected to the frame.

Example 16: The mobile electronic device of any of Examples 13-15, wherein electrical current flowing to the antenna is routed to both the chassis and the frame to create the parasitic arm, such that the chassis and the frame comprise the parasitic arm.

Example 17: The mobile electronic device of any of Examples 13-16, wherein the parasitic arm in the frame is L-shaped.

Example 18: The mobile electronic device of any of Examples 13-17, wherein the parasitic arm in the frame is S-shaped.

Example 19: The mobile electronic device of any of Examples 13-18, wherein the antenna operates within the specified frequency range for which the antenna's length is insufficiently long without implementing frequency tuners.

Example 20: A method of manufacturing may include providing a frame, mounting a printed circuit board (PCB) to the frame, and electrically connecting at least one antenna to the PCB via an antenna feed, wherein the antenna is shorter than a maximum specified length, wherein the antenna is to operate within a specified frequency range for which the antenna's length is insufficiently long, and wherein electrical current flowing to the antenna is routed to at least a portion of the frame to create a parasitic arm, such that the parasitic arm radiates in conjunction with the antenna, providing constructive interference in the specified frequency range.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 900 in FIG. 9) or that visually immerses a user in an artificial reality (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

In some examples, augmented-reality system 900 may also include a microphone array with a plurality of acoustic transducers 920(A)-920(J), referred to collectively as acoustic transducers 920. Acoustic transducers 920 may represent transducers that detect air pressure variations induced by sound waves. Each acoustic transducer 920 may be configured to detect sound and convert the detected sound into an electronic format (e.g., an analog or digital format). The microphone array in FIG. 9 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(I) and 920(J), which may be positioned on a corresponding neckband 905.

In some embodiments, one or more of acoustic transducers 920(A)-(J) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality system 900 may simulate binaural hearing and capture a 3D stereo sound field around about a user's head. In some embodiments, acoustic transducers 920(A) and 920(B) may be connected to augmented-reality system 900 via a wired connection 930, and in other embodiments acoustic transducers 920(A) and 920(B) may be connected to augmented-reality system 900 via a wireless connection (e.g., a BLUETOOTH connection). In still other embodiments, acoustic transducers 920(A) and 920(B) may not be used at all in conjunction with augmented-reality system 900.

Acoustic transducers 920 on frame 910 may be positioned in a variety of different ways, including along the length of the temples, across the bridge, above or below display devices 915(A) and 915(B), or some combination thereof. Acoustic transducers 920 may also be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(I) and 920(J)) that are part of the microphone array (or potentially form their own microphone subarray). Neckband 905 may also include a controller 925 and a power source 935.

Acoustic transducers 920(I) and 920(J) of neckband 905 may be configured to detect sound and convert the detected sound into an electronic format (analog or digital). In the embodiment of FIG. 9, acoustic transducers 920(I) and 920(J) may be positioned on neckband 905, thereby increasing the distance between the neckband acoustic transducers 920(I) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920 (D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium-ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 900 and/or virtual-reality system 1000 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 900 and/or virtual-reality system 1000 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 900 and/or virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:

a frame;

a printed circuit board (PCB) mounted to the frame; and at least one antenna electrically connected to the PCB via an antenna feed, wherein the antenna is to operate within a specified frequency range, wherein the frame includes a plurality of separate, electrically isolated locations to which electrical current is routable, each of the locations radiating at different frequencies, wherein a specified location of the frame is selected from the plurality of separate, electrically isolated locations on the frame, such that electrical current is routed to the selected specified location on the frame, the specified location being selected on the frame to act as a parasitic arm that provides constructive interference within the specified frequency range, and wherein electrical current flowing to the antenna is routed to the selected location on the frame to create the parasitic arm, such that the parasitic arm radiates in conjunction with the antenna, providing constructive interference in the specified frequency range.

2. The system of claim 1, further comprising a chassis that is electrically connected to the frame.

3. The system of claim 2, wherein electrical current flowing to the antenna is routed to both the chassis and the frame to create the parasitic arm, such that the chassis and the frame comprise the parasitic arm.

4. The system of claim 1, wherein the specified frequency range in which the antenna is to operate is lower than a maximum frequency that is providable by the antenna.

5. The system of claim 4, wherein the antenna is shorter than a maximum specified length.

6. The system of claim 4, wherein the electrical current flowing to the antenna is routed to the portion of the frame via a screw.

7. The system of claim 1, wherein the antenna is printed on a dielectric material and is positioned on a periphery portion of the frame.

8. The system of claim 1, wherein the parasitic arm of the antenna is configured to create a resonance within an ultra-high frequency band.

9. The system of claim 1, wherein the antenna is configured to operate in a plurality of frequency bands.

10. The system of claim 9, wherein the antenna is configured to operate within the specified frequency band and within an ultrahigh frequency band.

11. The system of claim 1, wherein the electrical current flowing to the antenna is routed to at least two different portions of the frame to create a dual parasitic arm having multiple resonances.

12. The system of claim 1, wherein the electrical current flowing to the antenna is routed to at least three different portions of the frame to create a triple parasitic arm having a plurality of resonances.

13. A mobile electronic device comprising:

a frame;

a printed circuit board (PCB) mounted to the frame; and at least one antenna electrically connected to the PCB via an antenna feed, wherein the antenna is to operate within a specified frequency range, wherein the frame includes a plurality of separate, electrically isolated locations to which electrical current is routable, each of the locations radiating at different frequencies, wherein a specified location of the frame is selected from the plurality of separate, electrically isolated locations on the frame, such that electrical current is routed to the selected specified location on the frame, the specified location being selected on the frame to act as a parasitic arm that provides constructive interference within the specified frequency range, and wherein electrical current flowing to the antenna is routed to the selected location on the frame to create the parasitic arm, such that the parasitic arm radiates in conjunction with the antenna, providing constructive interference in the specified frequency range.

14. The mobile electronic device of claim 13, wherein a location of the frame to which electrical current is routed is selected to ensure that the parasitic arm provides constructive interference within the specified frequency range.

15. The mobile electronic device of claim 13, further comprising a chassis that is electrically connected to the frame.

16. The mobile electronic device of claim 15, wherein electrical current flowing to the antenna is routed to both the chassis and the frame to create the parasitic arm, such that the chassis and the frame comprise the parasitic arm.

17. The mobile electronic device of claim 13, wherein the parasitic arm in the frame is L-shaped.

18. The mobile electronic device of claim 13, wherein the parasitic arm in the frame is S-shaped.

19. The mobile electronic device of claim 13, wherein the antenna operates within the specified frequency range for which the antenna's length is insufficiently long without implementing frequency tuners.

20. A method of manufacturing comprising:

providing a frame;

mounting a printed circuit board (PCB) to the frame; and electrically connecting at least one antenna to the PCB via an antenna feed, wherein the antenna is to operate within a specified frequency range, wherein the frame includes a plurality of separate, electrically isolated locations to which electrical current is routable, each of the locations radiating at different frequencies, wherein a specified location of the frame is selected from the plurality of separate, electrically isolated locations on the frame, such that electrical current is routed to the selected specified location on the frame, the specified location being selected on the frame to act as a parasitic arm that provides constructive interference within the specified frequency range, and wherein electrical current flowing to the antenna is routed to the selected location on the frame to create the parasitic arm, such that the parasitic arm radiates in conjunction with the antenna, providing constructive interference in the specified frequency range.

* * * * *